United States Patent Office 3,585,234
Patented June 15, 1971

3,585,234
PROCESS FOR PRODUCING 4-PHENYL-3-OXO-BUTANE-1 CARBOXYLIC ACID ESTERS
Hirosuke Yoshioka, Nishinomiya-shi, Nobushige Itaya, Minoo-shi, and Yutaka Matsumoto, Oita-shi, Japan, assignors to Sumitomo Chemical Company, Ltd., Higashi-ku, Osaka, Japan
No Drawing. Filed Oct. 9, 1967, Ser. No. 673,984
Claims priority, application Japan, Dec. 26, 1966, 41/85,485
Int. Cl. C07c 67/00, 69/94, 65/20
U.S. Cl. 260—476R                             5 Claims

ABSTRACT OF THE DISCLOSURE

A process for producing 4-phenyl-3-oxo-butane-1-carboxylic acid esters comprising reacting a 4-phenyl-4-cyano-3-oxo-butane-1-carboxylate with orthophosphoric acid or aqueous orthophosphoric acid, thereby hydrolyzing and removing the cyano group of said ester prior to hydrolysis of the ester portion thereof. The reaction progresses smoothly and quickly, and even when more or less amount of free carboxylic acid is by-produced, the free acid can be converted into the desired ester by adding the corresponding alcohol to the reaction system. In the case of cyano-carboxylic acid also, the reaction proceeds smoothly and therefore according to the present process, the desired ester can be produced also from this starting material by adding the corresponding alcohol to the reaction system.

---

This invention relates to a process for producing 4-phenyl-3-oxo-butane-1-carboxylic acid esters. More particularly, the invention pertains to a method for preparing 4-phenyl-3-oxo-butane-1-carboxylates from 4-phenyl-4-cyano-3-oxo-butane-1-carboxylates or free acid of such esters.

Heretofore, the production of 4-phenyl-3-oxo-butane-1-carboxylates (I) by the removal of cyano groups of 4-phenyl-4-cyano-3-oxo-butane-1-carboxylates (II) was carried out, according to the equation shown below, by simultaneously effecting the hydrolysis of the cyano groups and ester portions of said esters in the presence of hydrochloric acid incorporated with acetic acid to once prepare 4-phenyl-3-oxo-butane-1-carboxylic acid (III), and then subjecting said acid to reesterification in the presence of sulfuric acid or the like.

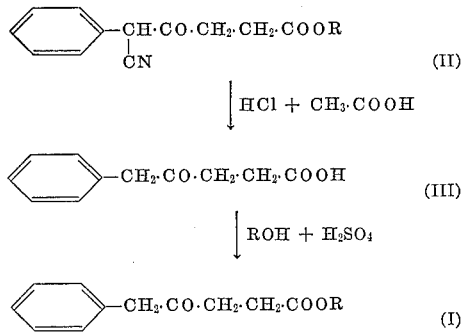

wherein R is a lower alkyl.

The present inventors made repeated studies with the object of obtaining the esters (I) at one stage by removing cyano groups from the cyano esters (III), retaining the ester portions thereof as they are. As the result, the inventors have attained the present invention.

In the first place, the inventors could know the following fact:

When the cyano ester (II) is subjected to hydrolysis in the presence of hydrochloric acid or hydrobromic acid, the ester functional group of the ester first undergoes hydrolysis to form a 4-phenyl-4-cyano-3-oxo-butane-1-carboxylic acid of the Formula IV,

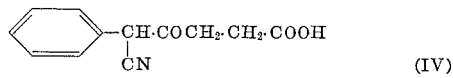

then the hydrosis of the cyano group and the subsequent decarboxylation occur, whereby the carboxylic acid (III) is obtained. However, the latter stage hydrolysis of cyano group progresses at a rate far slower than that of the former stage hydrolysis of ester group. For example, at the time when the cyano ester (II) has been heated and refluxed for 16 hours in the presence of 17% aqueous hydrochloric acid in acetic acid, the resulting carboxylic acid portion still contains about 30% of the cyano-carboxylic acid (IV). Under such circumstances it is entirely impossible not only to obtain the carboxylic acid (III) in a satisfactory state from the cyano ester (II) but also to obtain the ester (I) by removing cyano group from the cyano ester (II), retaining the ester portion as it is. Further, in such a method as above, the product is brought into a tarry state and hence is greatly colored and the yield thereof is not satisfactory.

However, the present inventors have newly found the fact that in the hydrolysis of cyano esters (II), orthophosphoric acid is a markedly effective reagent for the object of the present invention. That is, the inventors have discovered that when the cyano ester (II) is dissolved or partly suspended in orthophosphoric acid and is then heated, the decarboxylation of said ester due to the hydrolysis of cyano group is effected far more smoothly and quickly than in the conventional method, in which the reaction is carried out in the presence of hydrochloric acid or the like, and the removal of cyano group is complete in such a short time as 1–2 hours. The inventors have further found, contrary to expectation in view of the conventional technical concept, that depending on the reaction conditions, the product in accordance with the present process consists mainly of the ester (I) in which the ester portion of the cyano ester (II) has been retained.

The above reaction may be represented by the following equation:

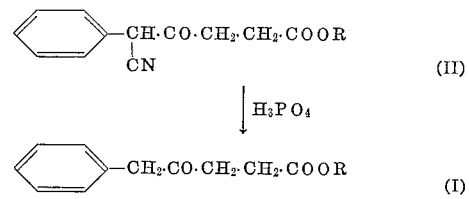

Generally, it is a well known concept that there are some cases where orthophosphoric acid is used in the hydrolysis of cyano groups to carboxylic acid groups or in the splinting thereof under decarboxylation. However, it has not been known that orthophosphoric acid is applied to carboxylates having cyano groups to attain such effects that only the removal of cyano groups is selectively effected and ester portions can be retained, like in the present process. These effects essentially coincide with the aforesaid object. Further, by virtue of these effects, the esters (I) can be obtained from the cyano esters (II) at one stage and in a state higher in yield and purity by more simplified reaction operations than in the conventional method. Moreover, there is required no step for the re-esterification of the carboxylic acid (III) which have once been obtained in the conventional method. These effects indicate the fact that the production process of esters (I) can be greatly improved. In the case of the carboxylic acid (IV) also, the above reaction proceeds smoothly and quickly, and the esters (I) can be obtained as well by adding the corresponding alcohols to the reaction system.

Thus, the present invention provides a process for producing 4-phenyl-3-oxo-butane-1-carboxylates, which comprises reacting 4-phenyl-4-cyano-3-oxo-butane-1-carboxylates with orthophosphoric acid thereby removing the cyano groups, retaining the ester functional groups as they are.

The invention provides further a process for producing 4-phenyl-3-oxo-butane-1-carboxylates which comprises reacting 4-phenyl-4-cyano-3-oxo-butane-1-carboxylic acid or esters thereof with orthophosphoric acid, wherein the corresponding alcohols are made present in the reaction system.

The 4phenyl-4-cyano - 3 - oxo-butane-1-carboxylates which are used as starting materials in the present invention can be obtained by reacting benzyl cyanide with dialkyl succinates in the presence of a sodium alcoholate, according to the following equation:

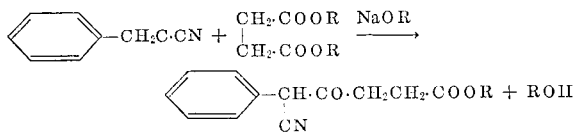

As the orthophosphoric acid to be employed in practicing the present process, one containing water may also be used. For example, 85% orthophosphoric acid, which is widely obtainable on commercial scale, can also be used. In the present process, there is such a general tendency that with increasing water content of the orthophosphoric acid, the reaction temperature required for the hydrolysis and removal of cyano groups becomes higher and the reaction rate becomes lower. Further, the ratio of retention of ester portions tends to be gradually lowered. On the other hand, however, the formation of coloring tarry substances greatly decreases with increasing water content of the acid. Ordinarily, therefore, orthophosphoric acid having a concentration of 60% or more is used, though the concentration is not strictly regulated.

The reaction temperature varies depending on the water content of orthophosphoric acid, but is ordinarily within the range of 100° to 200° C.

The reaction may be effected in the presence of a suitable solvent. Usable solvents are organic solvents such as toluene and xylene which take no part in the reaction, lower alcohols which are effective to increase the ester retention ratio in the reaction, and polyhydric alcohols such as ethylene glycol and the like which are effective to make the system homogeneous.

For completion of the reaction, a time of 1–2 hours is ordinarily sufficient. The reaction mixture, after cooling, is an oily substance composed mainly of ester (I) and a small amount of carboxylic acid (III), though the composition varies depending on the water content of orthophosphoric acid and on other conditions. Subsequently, the reaction mixture is diluted with water, ether as such or, if necessary, after converting the carboxylic acid into the ester by addition of a small amount of alcohol. Thereafter, the reaction mixture is extracted with a common organic solvent immissible with water and orthophosphoric acid, is washed with an aqueous sodium bicarbonate solution to remove acidic impurities, and is then freed from the solvent by evaporation, whereby the ester (I) is obtained in a high yield as a brown oily substance. The ester may be obtained in a purified state when subjected to reduced pressure distillation in order to remove slight amounts of colored impurities contained therein. Generally, when the ester (I) and the carboxylic acid (III) obtained according to the present process are summed up, the yield is substantially quantitative.

The esters (I) in accordance with the present process are very useful as intermediates for use in the preparation of insecticides and drugs.

The following examples illustrate the process of the present invention.

EXAMPLE 1

40 g. of ethyl 4-phenyl-4-cyano-3-oxo-butane-1-carboxylate was mixed with 115 cc. of 75% aqueous orthophosphoric acid. The mixture was heated with stirring at 125°–135° C. for 2 hours to complete decarboxylation. During the reaction, about 5 cc. of distilled water-ethanol was removed.

After allowing to stand at said temperature for additional 2 hours, the reaction mixture was poured in 500 cc. of cold water and was then extracted with benzene. The benzene layer was washed with a 7% sodium bicarbonate solution, was dried with $Na_2SO_4$ and was then freed from benzene by evaporation to obtain 12 g. of ethyl 4-phenyl-3-oxo-butane-1-carboxylate, B.P. 110° C./0.5 mm. Hg yield 33%.

On the other hand, the sodium bicarbonate washing was acidified with hydrochloric acid and was extracted with benzene, and the benzene layer was evaporated to obtain 21 g. of crystalline 4-phenyl-3-oxo-butane-1-carboxylic acid, M.P. 54° C., yield 66%.

EXAMPLE 2

A reaction mixture obtained in the same manner as in the first half of Example 1 which had completed decarboxylation was cooled to 70° C. The reaction mixture was charged with 40 cc. of anhydrous ethanol and was allowed to stand at said temperature for one hour. Subsequently, the mixture was subjected to reduced pressure distillation at said temperature, was cooled to room temperature, was poured in 500 cc. of cold water and was then extracted with benzene. Thereafter, the same operations as in the latter half of Example 1 were effected to obtain 29 g. of ethyl 4-phenyl-3-oxo-butane-1-carboxylate, yield 81%.

From the acid portion, 6 g. of 4-phenyl-3-oxo-butane-1-carboxylic acid was recovered.

EXAMPLE 3

40 g. of ethyl 4-phenyl-4-cyano-3-oxo-butane-1-carboxylate was mixed with 110 cc. of 85% orthophosphoric acid, and the mixture was heated with stirring. When the temperature had reached 115° C., decarboxylation of the mixture was observed, and the reaction was complete in about 2 hours. In this case, the reaction temperature was 135° C.

The reaction mixture was cooled to room temperature and was poured in 500 cc. of cold water. The resulting oily substance was extracted with benzene and was then fractionated by sodium bicarbonate liquid extraction into an ester portion and a carboxylic acid portion to obtain 22 g. of ethyl 4-phenyl-3-oxo-butane-1-carboxylate, yield 61%, and 12.4 g. of 4-phenyl-3-oxo-butane-1-carboxylic acid, yield 38%.

EXAMPLE 4

A reaction mixture obtained in the same manner as in Example 3 which had completed decarboxylation was cooled to 70° C. and was charged with 40 cc. of ethanol. After allowing to stand at said temperature for one hour, the reaction mixture was subjected to distillation under a reduced pressure of 30 mm. Hg, was cooled and was then poured in 500 cc. of cold water. Thereafter, the same operations as in the latter half of Example 3 were effected to obtain 30.6 g. of ethyl 4-phenyl-3-oxo-butane-1-carboxylate, yield 85%, and 4.5 g. of 4-phenyl-3-oxo-butane-1-carboxylic acid, yield 14%.

EXAMPLE 5

20 g. of the 4-phenyl-3-oxo-butane-1-carboxylic acid obtained in Example 4 was mixed with 70 cc. of 85% ortho phosphoric acid. The mixture was charged with 40 cc. of ethanol and was then heated at 70° C. for 30 minutes. Subsequently, the mixture was subjected to distillation under a reduced pressure of 30 mm. Hg, was poured in 300 cc. of cold water and was then extracted with benzene. From the resulting ester portion, there were recovered 17 g. of ethyl 4-phenyl-3-oxo-butane-1-carboxylate, yield 74%, and 5 g. of 4-phenyl-3-oxo-butane-1-carboxylic acid.

EXAMPLE 6

35.5 g. of 4-phenyl-4-cyano-3-oxo-butane-1-carboxylic acid was mixed with 100 cc. of 85% orthophosphoric acid. The mixture was heated with stirring at 120°–130° C. for 2 hours to complete decarboxylation. After cooling to 70° C., the mixture was charged with 20 cc. of ethanol and was then allowed to stand for additional one hour. Subsequently, the same after-treatments as in Example 3 to obtain 28 g. of ethyl 4-phenyl-3-oxo-butane-1-carboxylate, yield 75%.

What is claimed is:

1. A process for producing a 4-phenyl-3-oxo-butane-1-carboxylate, which comprises reacting a 4-phenyl-4-cyano-3-oxo-butane-1-carboxylate with orthophosphoric acid or aqueous orthophosphoric acid.

2. A process for producing a 4-phenyl-3-oxo-butane-1-carboxylate, which comprises reacting a 4-phenyl-4-cyano-3-oxo-butane-1-carboxylate with orthophosphoric acid or aqueous orthophosphoric acid, wherein a by-produced 4-phenyl-3-oxo-butane-1-carboxylic acid is converted into a corresponding ester by addition of an alcohol to the reaction system.

3. Process according to claim 1 wherein the reaction temperature is from 100 to 200° C., and the reaction time is from 1 to 2 hours.

4. Process according to claim 2 wherein the reaction with orthophosphoric or aqueous orthophosphoric acid is at a temperature of from 100 to 200° C. and the reaction time therefor is from 1 to 2 hours.

5. Process according to claim 4 wherein said alcohol is ethanol.

References Cited

Morrison & Boyd. Organic Chem. (1959), Alley & Bacon, Inc., pp. 686 and 7.

Morrison & Boyd. Organic Chem. (1959), Alley & Bacon, Inc., pp. 704 and 5.

Wagner & Fook, Synthetic Org. Chem. QD262W24 (1965) p. 412.

LEWIS GOTTS, Primary Examiner

E. J. GLEIMAN, Assistant Examiner

U.S. Cl. X.R.

260—515R